United States Patent
Yamaguchi et al.

(10) Patent No.: US 7,224,380 B2
(45) Date of Patent: May 29, 2007

(54) LIGHT-EMITTING DEVICE DRIVER AND IMAGE FORMING APPARATUS

(75) Inventors: Hidehiko Yamaguchi, Kanagawa (JP); Chikaho Ikeda, Kanagawa (JP); Hideki Moriya, Kanagawa (JP); Masao Ohmori, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 341 days.

(21) Appl. No.: 10/902,887

(22) Filed: Aug. 2, 2004

(65) Prior Publication Data

US 2005/0029965 A1   Feb. 10, 2005

(30) Foreign Application Priority Data

Aug. 8, 2003   (JP) .............................. 2003-206934

(51) Int. Cl.
*B41J 2/45*   (2006.01)

(52) U.S. Cl. .................... 347/247; 347/237; 347/132

(58) Field of Classification Search ............... 347/237, 347/247, 132; 372/38.02, 38.07
See application file for complete search history.

(56) References Cited

U.S. PATENT DOCUMENTS

| | | | | |
|---|---|---|---|---|
| 4,819,241 A | * | 4/1989 | Nagano | 372/38.03 |
| 5,936,986 A | * | 8/1999 | Cantatore et al. | 372/38.02 |
| 6,198,497 B1 | * | 3/2001 | Luque | 347/247 |
| 6,711,189 B1 | * | 3/2004 | Gilliland et al. | 372/38.02 |
| 2006/0133435 A1 | * | 6/2006 | Ikeda | 372/38.02 |

FOREIGN PATENT DOCUMENTS

| | | |
|---|---|---|
| JP | 62-62572 | 3/1987 |
| JP | 5-198844 | 8/1993 |
| JP | 9-83442 | 3/1997 |
| JP | 10-284783 | 10/1998 |
| JP | 3068723 B | 5/2000 |

* cited by examiner

*Primary Examiner*—Huan Tran
(74) *Attorney, Agent, or Firm*—Morgan, Lewis & Bockius

(57) ABSTRACT

A light-emitting device driver that includes a driver unit that drives a light-emitting device, a compensator that compensates for at least one of the rising and falling responses of the driver unit, a switching unit that switches on and off the compensator, and a control unit that performs on/off control on the switching unit.

18 Claims, 9 Drawing Sheets

Fig. 3
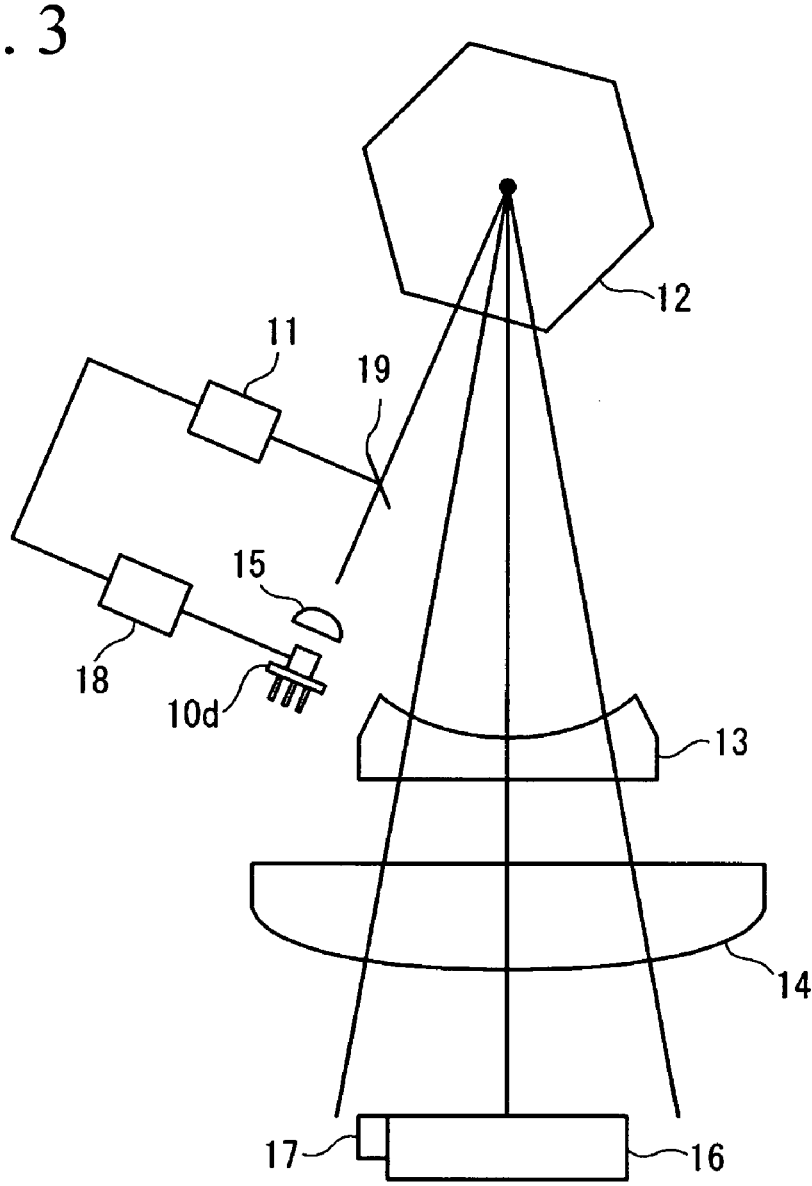
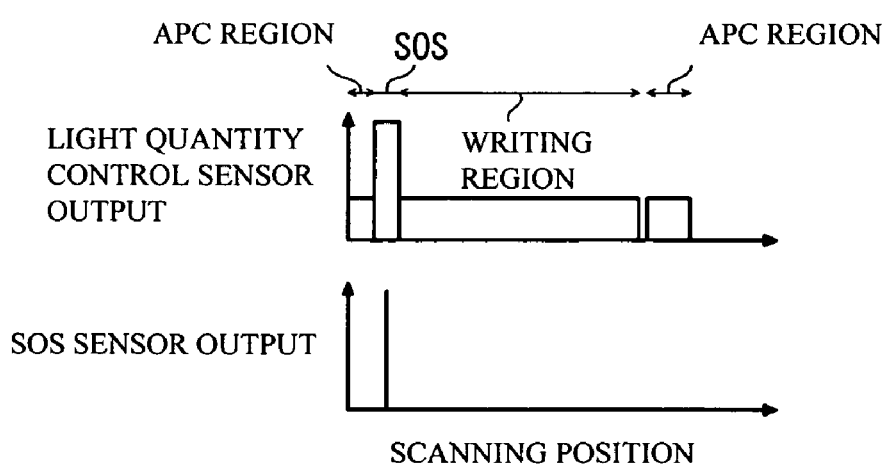

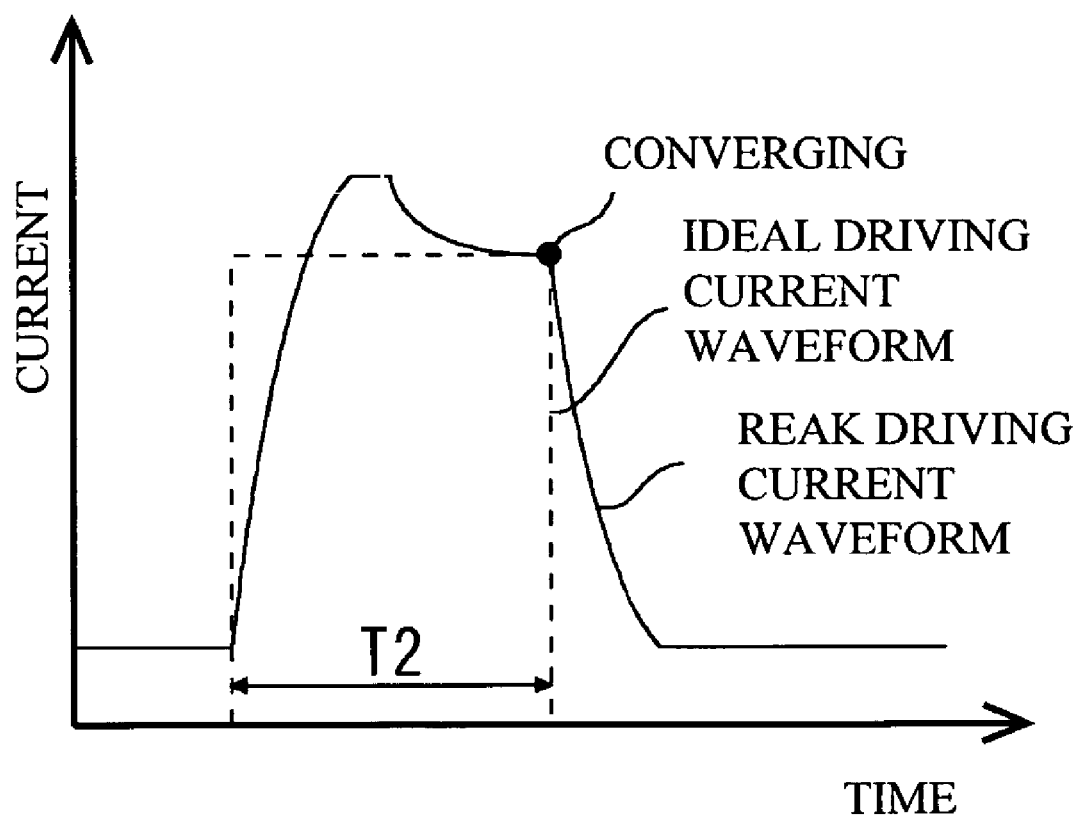

LIGHT-EMITTING DEVICE DRIVER AND IMAGE FORMING APPARATUS

BACKGROUND OF THE INVENTION

1. Field of the Invention

The present invention generally relates to a driver for driving a light-emitting device and an image forming apparatus, and more particularly, to a light-emitting device driver that is suitably used for driving a laser device as a light source of laser xerography and an image forming apparatus that is equipped with the light-emitting device driver.

2. Description of the Related Art

In the field of laser xerography in which laser devices are used as light sources, there is an increasing demand for devices with higher resolution and higher-speed performance. However, there is a limit to the speed at which on/off control can be performed on the driving of a laser device in accordance with input image data (the speed will be hereinafter referred to as the modulation speed). If the resolution in the sub scanning direction, as well as in the main scanning direction, is to be increased in a case where the number of laser beams is one, the modulation speed is also increased. So as to increase the resolution in the sub scanning direction without an increase in the modulation speed, it is necessary to increase the number of laser beams. In a case where the number of laser beams is four and the modulation speed is the same as the modulation speed in the case of one laser beam, the resolution in the main scanning direction and the resolution in the sub scanning direction can be doubled.

Semiconductor lasers that are employed as light sources in laser xerography can be categorized roughly into two types. One of the types is an edge-emitting type (hereinafter referred to as edge-emitting lasers) with a structure for emitting laser beams in a direction parallel to an active layer. The other is a surface-emitting type (hereinafter referred to as surface-emitting lasers) with a structure for emitting laser beams in a direction perpendicular to an active layer. Conventionally, edge-emitting lasers have been used as laser beam sources in laser xerography.

With the edge-emitting laser, however, it is technically difficult to increase the number of laser beams. The surface-emitting laser is more advantageous with an increased number of laser beams than the edge-emitting laser. For this reason, devices equipped with surface-emitting lasers that can emit a large number of laser beams have been developed as the laser beam sources in the field of laser xerography, so as to respond to the public demand for higher resolution and higher-speed performance.

Meanwhile, the driving circuits of laser emitting devices for laser xerography have wiring loads, resistances, and parasitic capacitances that vary with the types of mounting of the laser emitting devices. Therefore, the conventional light-emitting device is equipped with compensating circuit that increases the response of the light-emitting device.

Japanese Unexamined Patent Publication Nos. 62-62572, 9-83442, and 10-284783 (hereinafter referred to as Patent Documents 1, 2, and 3, respectively) each discloses a method for compensating for the driving current of a light-emitting device by transitionally causing current to flow in and out, using a differential current circuit that includes a capacitor C and a resistance R.

Also, driving methods by which voltage driving and current driving are both employed have been developed. Japanese Unexamined Patent Publication No. 5-198844 (Patent Document 4) discloses a technique for preventing micro-light emission by applying a reversed bias voltage when the light-emitting device is not emitting light. Further, Japanese Patent Publication No. 3068723 (Patent Document 5) discloses a technique for preventing excessive current flow by performing a constant voltage driving operation until the current flowing forward in a semiconductor laser reaches a predetermined set value, and then performing a current driving operation.

In each of the techniques disclosed in Patent Documents 1, 2, and 3, the respective compensating circuit has a large circuit size, because a current flows in (or is applied) transitionally in accordance with the CR time constant. When any of these techniques is applied to a multi-laser device that has surface-emitting lasers as light sources, it is necessary to employ compensating circuits that have different time constants suitable for the respective laser beam sources. As a result, the chip size increases, and it becomes difficult to put driving circuits into one chip, especially in a multi-laser device.

Also, by the technique disclosed in Patent Document 4, current and voltage are repeatedly applied in synchronization with image data. So as to prevent micro-light emission in such a structure, it is necessary to constantly apply a voltage while the light-emitting device is not emitting light. Therefore, this structure can neither function as an alternative device for the above-described compensating circuit, nor adjust the voltage-applied time. Furthermore, by the technique disclosed in Patent Document 5, the voltage driving time is determined by the current value. Therefore, the voltage driving time cannot be adjusted in accordance with the performance of each light-emitting device, and this technique cannot provide an alternative mechanism for the above-described compensating circuit.

SUMMARY OF THE INVENTION

The present invention has been made in view of the above circumstances and provides a driver for a light-emitting device and an image forming apparatus equipped with the driver.

According to one aspect of the present invention, there is provided a light-emitting device driver comprising: a driver unit that drives a light-emitting device; a compensator that compensates for at least one of a rising response and a falling response of the driver unit; a switching unit that switches on and off the compensator; and a control unit that performs on/off control on the switching unit.

According to yet another aspect of the present invention, there is provided A light-emitting device driver including: a current driver coupled to a laser diode; a switch; a voltage driver selectively coupled to the laser diode via the switch; and a controller that applies a control signal to the switch so that the switch can be kept ON during a period of time indicated by the control signal.

According to yet another aspect of the present invention, there is provided an image forming apparatus comprising: a light-emitting device; and a light-emitting device driver, the light-emitting device that includes: a driver unit that drives the light-emitting device; a compensator that compensates for at least one of a rising response and a falling response of the driver unit; a switching unit that switches on and off the compensator; and a control unit that performs on/off control on the switching unit.

According to a further aspect of the present invention, there is provided an image forming apparatus comprising: a laser diode; and a driver, the driver including: a current driver coupled to the laser diode; a switch; a voltage driver selectively coupled to the laser diode via the switch; and a controller that applies a control signal to the switch so that the switch can be kept ON during a period of time indicated by the control signal.

BRIEF DESCRIPTION OF THE DRAWINGS

Preferred embodiments of the present invention will be described in detail based on the following figures, wherein:

FIG. 3 illustrates an example structure of a laser scanning system of laser xerography in the form of an image forming apparatus equipped with a light-emitting device driver of the present invention;

FIG. 9 shows driving current waveforms to illustrate the minimum pulse width in accordance with the present invention.

DESCRIPTION OF THE PREFERRED EMBODIMENTS

The following is a description of embodiments of the present invention, with reference to the accompanying drawings.

(First Embodiment)

Figure 1:
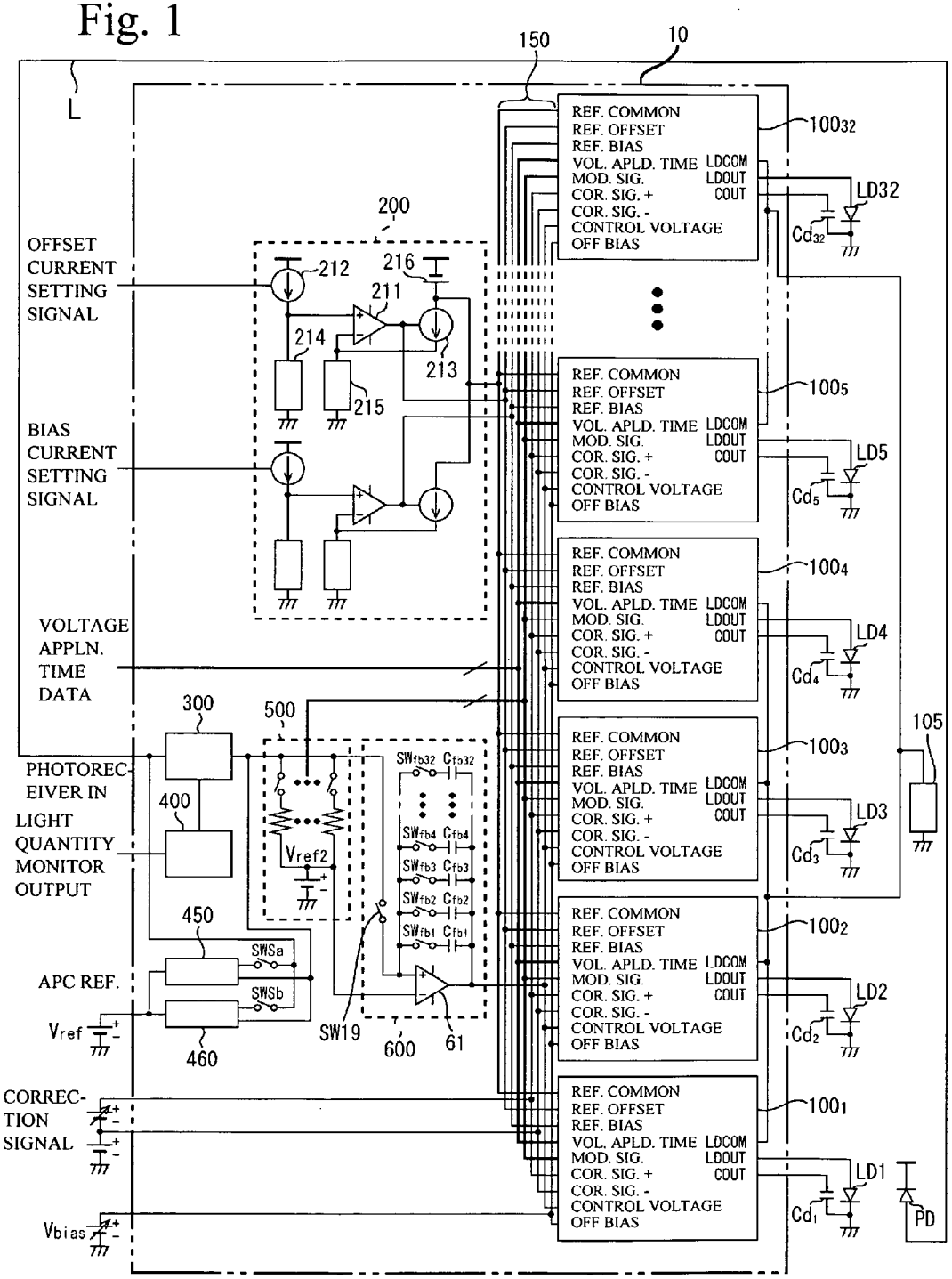
FIG. 1 is a circuit diagram illustrating the entire structure of a light-emitting device (laser diode) driver in accordance with a first embodiment of the present invention.

A first embodiment of the present invention will be first described in detail. FIG. 1 illustrates the entire structure of a light-emitting device driver in accordance with this embodiment. The light-emitting device driver 10 drives light-emitting devices. In the structure shown in FIG. 1, the light-emitting device driver 10 drives thirty-two light-emitting devices LD1 through LD32. In other words, the light-emitting device driver 10 has a 32-channel structure. Each of the light-emitting devices LD1 through LD32 may be a surface-emitting laser diode (or a VCSEL: Vertical-Cavity Surface-Emitting Laser). The laser diodes LD1 through LD32 may be arranged in matrix writing. Preferably, the laser diodes LD1 through LD32 may be arranged on a single chip. The light-emitting device driver 10 (hereinafter referred to as laser diode driver 10) may be formed with an IC chip, for example, and may include circuits described below.

The laser diode driver 10 has driver units $100_1$ through $100_{32}$ allotted to the respective channels, which are the respective laser diodes LD1 through LD32. The laser diode driver 10 also includes a common-control-potential setting circuit 200, a current amplifier 300, a light quantity monitor 400, a forced lighting circuit 500, and an APC (Automatic Power Control) circuit 600, which serve as a common control unit for the respective channels.

The driver units $100_1$ through $100_{32}$ receive signals from the common control unit of the respective channels via a bus 150, and perform drive control operations on the respective laser diodes LD1 through LD32. More specifically, the driver units $100_1$ through $100_{32}$ perform an APC operation to control the light quantity of each of the laser diodes LD1 through LD32, and also perform modulation control after the APC operation. As will be described later, in the APC operation, the driver units $100_1$ through $100_{32}$ control the voltage and current to be applied to the laser diodes LD1 through LD32. In a voltage driving operation, the driver units $100_1$ through $100_{32}$ control capacitors $Cd_1$ through $Cd_{32}$ that are connected to the respective cathodes of the laser diodes LD1 through LD32, via the respective terminals COUT. In a current driving operation, the driver units $100_1$ through $100_{32}$ control the amount of current flowing into the laser diodes LD1 through LD32, via the respective terminals LDOUT.

Every several ones of the driver units $100_1$ through $100_{32}$ are connected to one another via terminals LDCOM, and are also connected to a load 105. In the structure shown in FIG. 1, the terminals LDCOM of the driver units $100_1$ through $100_4$ are connected to one another, and are further connected to one end of the load 105 that has the other end connected to the ground. When not driving each corresponding laser diode, each of the driver units $100_1$ through $100_{32}$ outputs a current in accordance with the driving current (a complementary output). The current is applied to the load 105, so that a constant amount of current always flows through the laser diode driver 10, regardless of the number of lighting times of the laser diodes. Thus, the laser diode driver 10 can operate steadily.

After setting the laser beam quantity of each of the laser diodes LD1 through LD32 at a suitable value through the APC operation, the laser diode driver 10 performs modulation control. The APC operation is performed as follows. First, the laser beam quantity of the laser diode LD1 is adjusted. The driving device $100_1$ drives the laser diode LD1. Current flows into a photodetector PD (a photodiode, for example; equivalent to a photodetector 11 that will be described later) that is provided for all the laser diodes LD1 through LD32. The amount of current flowing into the photodetector PD is determined by the laser beam quantity of the laser diode LD1. When the current flows into the photodetector PD, the current amplifier 300 switches a switch SWSa on, and then receives a current containing an adding current supplied from a current source 450 with a low impedance, thereby amplifying the current. Here, a switch SWSb is also switched on, so that the adding current is canceled by a reference current supplied from a current source 460. The remaining current is supplied to a resistance that is connected to a reference voltage Vref2, so that the current from the current amplifier 300 is converted into a voltage. The voltage (a detection voltage) is then output to the APC circuit 600 via a switch SW19. The APC circuit 600 includes an operational amplifier 61 and series circuits each containing one switch (one of switches SWfb1 through SWfb32) and a capacitor (one of capacitors Cfb1 through Cfb32). Each of the series circuits is connected to the output terminal of the operational amplifier 61 and the inverting input terminal of the operational amplifier 61. Each of the series circuits forms a sample and hold circuit that corresponds to one laser diode. For example, the sample and hold circuit composed of the switch SWfb1 and the capacitor Cfb1 corresponds to the laser diode LD1. Likewise, the sample and hold circuit composed of the switch SWfb32 and the capacitor Cfb32 corresponds to the laser diode LD32.

The operational amplifier 61 amplifies the differential voltage that is generated when the laser diode LD1 is driven. The operational amplifier 61 then outputs the amplified differential voltage to the corresponding signal line of the bus 150. The driver unit 100, adjusts the driving current to be applied to the laser diode LD1, so that the differential voltage becomes zero. As a result, the laser beam quantity of the laser diode LD1 varies, and the amount of current flowing into the photodetector PD also changes. The detection voltage set in accordance with the amount of current flowing into the photodetector PD is then output from the current amplifier 300 to the APC circuit 600. Through the feedback control operation described above, the adding current added to the current at the input and output of the current amplifier 300 is canceled, and the conditions for driving the laser diode LD1 is set so that the laser beam quantity becomes equivalent to the reference current generated from an APC reference voltage Vref. The setting of the driving conditions involves adjustment of the driving voltage and driving current to be applied to the laser diode LD1 to the values corresponding to the APC reference voltage Vref.

While the laser diode LD1 is controlled in the above-described manner, only the switch SWfb1 among the thirty-two sample and hold circuits of the APC circuit 600 is on, and the voltage is accumulated in the capacitor Cfb1 when the laser beam quantity of the laser diode LD1 approaches the value equivalent to the APC reference voltage Vref. Likewise, the APC operation is performed on the laser diodes LD2 through LD32 one by one.

As will be described later, the APC operation should preferably be performed two times on each laser diode. In the second-time APC operation, the switch SWSa, which is switched on in the first-time APC operation, is switched off. As the amount of canceling current supplied to the output end of the current amplifier 300 is simply equal to the total amount of the reference current and the adding current, the light receiving current is controlled with the current corresponding to the total amount of the reference current and the adding current. The thirty-two sample and hold circuits in the APC circuit 600 can be used in both the first-time and second-time APC operations, but it is also possible to employ another set of thirty-two sample and hold circuits that are designed especially for the second-time APC operation.

The light quantity monitor 400 outputs a light quantity monitoring signal that represents the laser beam quantity of each of the laser diodes LD1 through LD32, based on the amount of current flowing in the current amplifier 300.

The forced lighting circuit 500 generates a synchronization signal that is required prior to the APC operations. In an image processing apparatus such as a copying machine, a printer, or a facsimile machine, into which the laser diode driver 10 is incorporated, an optical sensor is provided just before the writing start position, so that the image writing position is accurately determined. In such an image processing apparatus, the writing start position is determined from the timing of the light of each laser diode crossing the optical sensor.

FIG. 3 illustrates an example structure of a laser scanning system of laser xerography that is an embodiment of the image forming apparatus equipped with the laser diode driver of the present invention. FIG. 3 also shows the output of each sensor. The fundamental structure of the laser beam scanning system of a laser xerography apparatus is as follows. Laser beams are emitted from a laser beam source 10d onto the surface of a photosensitive member 16 via a lens 15, a polygon mirror 12, and lenses 13 and 14. As the polygon mirror 12 revolves, the laser beams repeatedly scan the surface of the photosensitive member 16. Part of the laser beams emitted from the laser beam source 10d is applied to a photodetector 11 via a semitransparent mirror 19. In FIG. 3, the output of the photodetector 11 is shown as the output of a light quantity control sensor, while the output of an optical sensor 17 that is provided just before the writing start position is shown as the output of a SOS (Start of Scan) sensor. The regions for APC are located on the front and back sides of the scanning region. Reference numeral 18 indicates a device that is equivalent to the laser diode driver 10.

As described earlier, the laser beam quantity of each of the laser diodes LD1 through LD32 is smaller than the laser beam quantity of an edge-emitting laser. Therefore, a few of the laser diodes LD1 through LD32 are simultaneously switched on to scan the SOS sensor. In this case, it is preferable to switch on only the few laser diodes located in the middle of the two-dimensional arrangement of the laser diodes LD1 through LD32. However, the laser diodes LD1 through LD32 are switched on one by one in the APC operation to perform the condition setting (setting the gain of the feedback loop). If a predetermined number of laser diodes are simultaneously switched on, the APC feedback loop might oscillate. So as to eliminate this problem, the forced lighting circuit 500 changes the size of the load on the current amplifier 300 in accordance with a modulation signal (modulation data). More specifically, a load that is set in accordance with the number of laser diodes to be switched on is connected to the output end of the current amplifier 300. In this structure, resistances are connected to the output end of the current amplifier 300 via switches. As for the operational amplifier 61, the forced lighting circuit 500 reduces the current source conversion gain in accordance with the number of laser diodes to be switched on, so that the entire negative feedback gain does not vary. By doing so, the state of the structure becomes equivalent to a state in which only one of the laser diodes is on. Accordingly, the gain of the feedback loop becomes equivalent to the value that is obtained in the state in which only one of the laser diode is on. Thus, the oscillation of the feedback loop can be prevented.

The common-control-potential setting circuit 200 generates control potentials that are required for generating currents that are necessary to the driver units $100_1$ through $100_{32}$. In the structure shown in FIG. 1, the common-control-potential setting circuit 200 includes a circuit that generates a common potential for setting a bias current that flows in each of the driver units $100_1$ through $100_{32}$, and a circuit that generates a common potential for generating an offset current. The bias current and the offset current are typical examples, and control potentials that are necessary for generating any current required for driving and controlling each of the driver units $100_1$ through $100_{32}$ can be set. The common-control-potential for setting the offset current is generated by a circuit that includes an operational amplifier 211, current sources 212 and 213, and loads 214 and 215. The common-control-potential for setting the bias current and the common control potentials for setting other kinds of current are generated by circuits of the same type as the above. In accordance with an offset current setting signal supplied from the outside, the current source 212 supplies a supported current to the load 214. The terminal voltage of the load 214 is applied to a positive terminal of the operational amplifier 211. The constant current source 213 connected to a constant voltage source 216 supplies a current to the load 215 in accordance with the output of the operational amplifier 211. The terminal voltage of the load 215 is applied to a negative terminal of the operational amplifier 211. The operational amplifier 211 controls the current source 213 so as to apply the same amount of current as the offset current that is set in accordance with the offset current setting signal. At this point, the output signal of the operational amplifier 211 is output to the corresponding bus line of the bus 150. Meanwhile, the positive voltage of the constant voltage source 216 is output to the corresponding bus line of the bus 150. These bus lines are used for the common control potentials and the driver units $100_1$ through $100_{32}$. In this manner, the offset current value that is externally set is applied as a differential voltage to each of the driver units $100_1$ through $100_{32}$ via the bus 150. In accordance with the applied differential voltage, each of the driver units $100_1$ through $100_{32}$ generates an offset current in a later described manner. Accordingly, even if the source voltage of the constant voltage source 216 varies, the potential difference becomes constant, and adverse influence of a variation in the source voltage can be avoided. In this structure, it is preferable to transmit the output voltage of the operational amplifier 211 and the voltage of the constant voltage source 216 through parallel twin lines.

Figure 2:
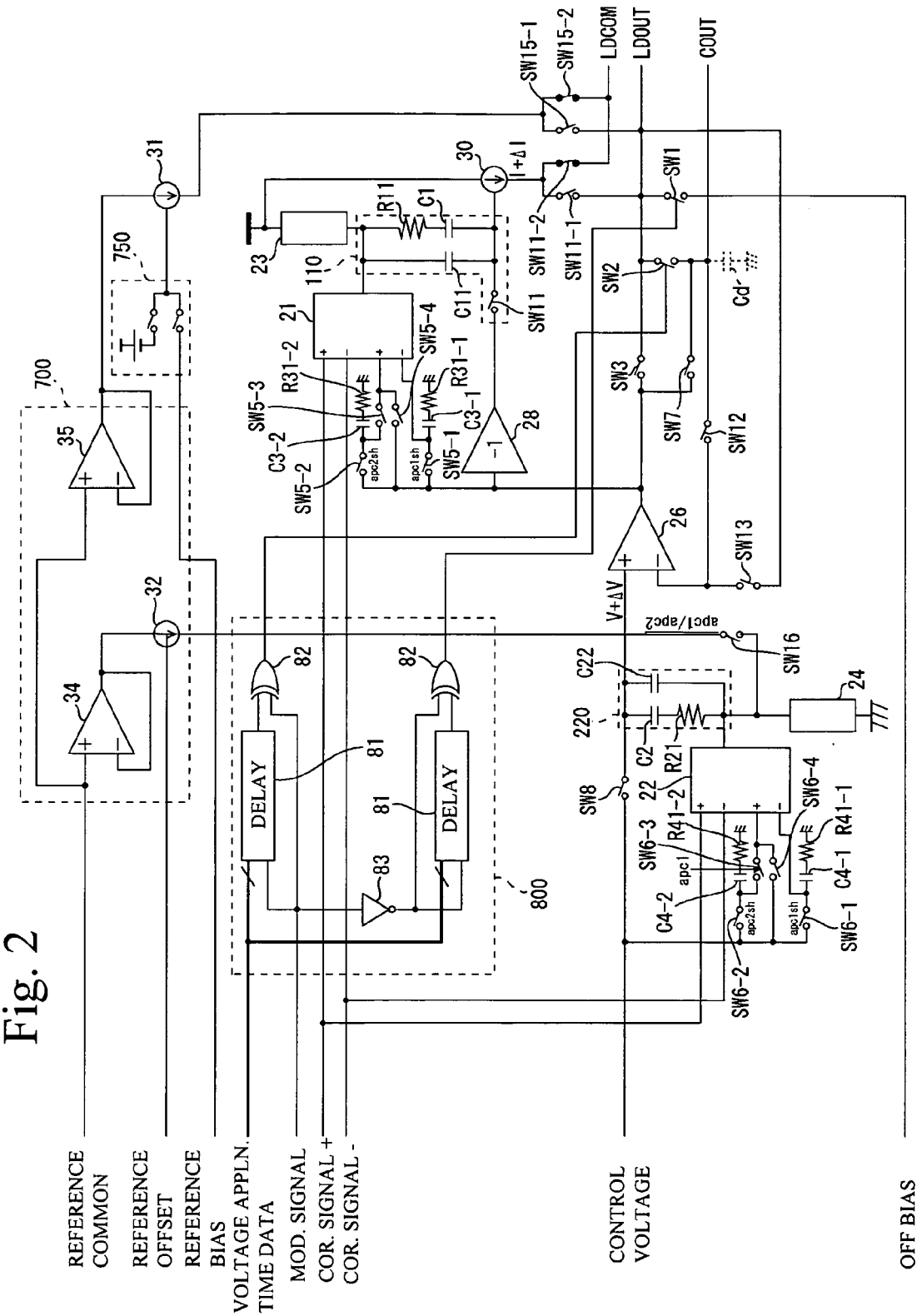
FIG. 2 is a circuit diagram illustrating the structure of a driver of the light-emitting device driver in accordance with the first embodiment of the present invention.

Referring now to FIG. 2, the inner structure of each of the driver units $100_1$ through $100_{32}$ will be described. As all the driver units $100_1$ through $100_{32}$ have the same structures, the inner structure of a driver unit 100 that represents each of the driver units $100_1$ through $100_{32}$ will be described below.

The driver unit 100 includes two multipliers 21 and 22. The multiplier 21 is to control a current source 30, while the multiplier 22 is to control the corresponding one of the capacitors $Cd_1$ through $Cd_{32}$ shown in FIG. 1. The corresponding one of the capacitors $Cd_1$ through $Cd_{32}$ will be hereinafter denoted by Cd, and is indicated by a broken line in FIG. 2. The capacitor Cd functions as a voltage source for a short time during which a laser driving voltage rises. The current source 30 generates the current to be applied to the corresponding laser diode LD, and the capacitor Cd that functions as a voltage source applies a driving voltage to the corresponding laser diode LD.

Here, the relationship (the voltage-current characteristics) between the driving current of the surface-emitting laser and the driving voltage (the terminal voltage) shows proportionality (a linear relationship) in a practical range, as the internal resistance of the surface-emitting laser is high. There is proportionality (a linear relationship) also between the driving current and the laser beam quantity in the practical range. With the characteristics being taken into account, the amount of the current to be generated from the current source 30 is determined so that the laser beam quantity of the laser diode LD becomes equal to a reference light quantity (a first light quantity) in the first-time APC operation, and that the laser beam quantity becomes equal to a second light quantity in the second-time APC operation. Likewise, the driving voltage to be accumulated in the capacitor Cd is determined so that the laser beam quantity of the laser diode LD becomes equal to the reference light quantity (the first light quantity) in the first-time APC operation, and that the laser beam quantity becomes equal to the second light quantity in the second-time APC operation.

Through the interpolation or the extrapolation process using those two values, the laser beam quantity can be adjusted to a desired light quantity.

The multipliers 21 and 22 may be four-quadrant analog multipliers, and a capacitor may be employed as a voltage source to be connected to the multipliers 21 and 22. The inputs to each of the multipliers 21 and 22 have a differential structure. Where two differential inputs that are denoted by "+" and "−" in each of the multipliers 21 and 22 in FIG. 2 are "V1$a$, V1$b$" and "V2$a$, V2$b$", the current to be output from each of the multipliers 21 and 22 with the differential structures can be defined as: Iout=$\alpha$(V1$a$−V1$b$)(V2$a$−V2$b$), $\alpha$ being a constant.

In this laser driving device, a correction signal is applied to one input terminal (the multiplier terminal) of each of the multipliers 21 and 22, and a control voltage is applied to the other input terminal (the multiplicand terminal) of each of the multipliers 21 and 22. When the positive output of the complementary output of a multiplier with a differential structure is used, an offset current normally exists. However, even if an offset exists in each of the multipliers 21 and 22, capacitors C1 and C2 connected to the respective outputs cancel the offset in the APC operations. The correction signal is set suitably for a situation in which the laser beam quantity varies as the laser beam scanning position changes. Here, the control voltage is set in accordance with the laser beam scanning position.

Through the first-time APC operation, the first light quantity (referred to as the reference value) is set as follows: the switch SWSa is switched on, the switch SWSb is off, a switch SW1 is off, a switch SW2 is off, a switch SW3 is off, a switch SW5-1 is on, a switch SW5-2 is off, a switch SW5-3 is off, a switch SW5-4 is on, a switch SW6-1 is on, a switch SW6-2 is off, a switch SW6-3 is off, a switch SW6-4 is on, a switch SW7 is off, a switch SW8 is on, a switch SW11 is on, a switch SW11-1 is on, a switch SW11-2 is off, a switch SW12 is off, a switch SW13 is on, a switch SW15-1 is off, a switch SW15-2 is on, a switch SW16 is off, and the switch SWSa is on. When the first light quantity is to be set, a correction signal of 0V is applied to the multiplier terminal of each of the multipliers 21 and 22. In such a situation, the multiplier is 0, and accordingly, each of the multipliers 21 and 22 outputs an offset voltage, regardless of the amount of the control voltage applied to the multiplicand terminal. Also, a first APC reference voltage Vref1 is applied to the operational amplifier 61 of the APC circuit 600 shown in FIG. 1. The operational amplifier 61 outputs such a control voltage that the laser beam quantity of the laser diode LD becomes equivalent to the first APC reference voltage Vref1. The control voltage is applied to the current source 30 via the switch SW8, an operational amplifier 26, an inverter 28, and the switch SW11 shown in FIG. 2. In accordance with the control voltage, the current source 30 applies a current to the laser diode LD. Also, the control voltage output from the operational amplifier 26 is stored in a capacitor C3-1 of a sample and hold circuit. Since the correction signal is set at 0V, the multiplier 21 outputs an offset voltage. Accordingly, a capacitor C1 is charged with the differential voltage between the control voltage and the offset voltage output from the multiplier 21. Meanwhile, the control voltage output from the operational amplifier 61 shown in FIG. 1 is applied to a capacitor C2, and is stored in a capacitor C4-1 of a sample and hold circuit. Since the correction signal is set at 0V, the multiplier 22 outputs an offset voltage. Accordingly, the capacitor C2 is charged with the differential voltage between the control voltage and the offset voltage output from the multiplier 22.

Through the second-time APC operation, the second light quantity (referred to as a correction light quantity) is set as follows: the switch SWSa is switched off, the switch SWSb is off, the switch SW1 is off, the switch SW2 is off, the switch SW3 is off, the switch SW5-1 is off, the switch SW5-2 is on, the switch SW5-3 is on, the switch SW5-4 is off, the switch SW6-1 is off, the switch SW6-2 is on, the switch SW6-3 is on, the switch SW6-4 is off, the switch SW7 is off, the switch SW8 is off, the switch SW11 is off, the switch SW11-1 is on, the switch SW11-2 is off, the switch SW12 is off, the switch SW13 is on, the switch SW15-1 is off, the switch SW15-2 is off, the switch SW16 is off, and the switch SWSa is off. When the second light quantity is to be set, a correction signal with a predetermined voltage is applied to the multiplier terminal of each of the multipliers 21 and 22. As the switch SWSa is off, the operational amplifier 61 outputs such a control voltage as to increase the light quantity output from the photodetector PD by the amount of adding current of the current source 450 in the first-time APC operation. The control voltage is applied to the current source 30 via the switch SW8, the operational amplifier 26, the inverter 28, the switch SW5-2, the switch SW5-3, the multiplier 21, a resistance R11, and the capacitor C1. In accordance with the control voltage, the current source 30 changes the current supplied from the photodetector PD from the reference current to a current obtained by adding the adding current to the reference current. Also, the control voltage output from the operational amplifier 26 is stored in a capacitor C3-2 of a sample and hold circuit. The capacitor C1 is charged with the differential voltage between the control voltage and the output of the multiplier 21. The current applied to the laser diode LD in the first-time APC operation can be expressed as: I+ΔI. Meanwhile, the control voltage output from the operational amplifier 61 shown in FIG. 1 is applied to the capacitor C2, and is stored in a capacitor C4-2 of a sample and hold circuit. The capacitor C2 is charged with the differential voltage between the control voltage and the output of the multiplier 22. Where the voltage stored in the capacitor C2 in the first-time APC operation is denoted by V, the voltage stored in the capacitor C2 in the second-time APC operation can be expressed as: V+ΔV.

In the above-described first-time APC operation, the switches SW6-1 and SW6-4 are on, while the switches SW6-2 and SW6-3 are off. In the second-time and later APC operations, however, the switches SW6-3 and SW6-1 may be on, while the switches SW6-2 and SW6-4 are off. This setting is the same as the conditions for modulation, and accordingly, a higher accuracy can be expected.

At the time of modulation of the laser diode LD, a correction voltage corresponding to the correction light quantity determined in accordance with the laser beam scanning position is applied to the multiplier terminal of each of the multipliers 21 and 22. By doing so, the driving voltage to be applied to the surface-emitting laser from the voltage source consisting of the multiplier 22, the capacitor C2, and the operational amplifier 26, and the driving current to be applied from the current source 30 to the laser diode LD, are simultaneously controlled so that the laser diode LD emits a quantity of light that has been corrected in accordance with the laser beam scanning position.

The resistance R11 is connected in series with the capacitor C1. In this embodiment, a sample and hold circuit 110 that includes the capacitor C1 is formed with a low pass filter. With this structure, high frequency noise that is caused when the switch SW11 is switched on or off can be reduced. Also, a capacitor C11 is connected in parallel with the low pass filter. Accordingly, a phase delay of the negative feedback loop can be prevented by the time constant of the low pass filter. Likewise, a resistance R21 is connected in series with the capacitor C2, so that a sample and hold circuit 220 including the capacitor C2 is formed with a low pass filter. With this structure, high frequency noise that is caused when the switch SW8 is switched on or off can be reduced. Further, a capacitor C22 that prevents a phase delay of the negative feedback loop is connected in parallel with the low pass filter that includes the capacitor C2 and the resistance R21, so that oscillation can be prevented in the negative feedback loop.

A voltage-applied time adjusting circuit 800 adjusts the period of time during which a voltage is applied to the laser diode LD by controlling the switch SW2. Here, the voltage to be applied to the laser diode LD is the voltage accumulated in the capacitor Cd. As described earlier, the laser diode LD is driven by controlling the voltage and current to be applied to the laser diode LD in this embodiment. The laser diode LD is first driven by voltage, and is then driven by current. In this embodiment, the voltage-applied time required for the voltage driving is adjusted suitably for the type of mounting of the laser diode LD. For example, in the case shown in FIG. 2 where a long time is required for startup because the wire extending from the LDOUT terminal to the laser is very long, the voltage-applied time can be adjusted suitably for the long startup time.

The voltage-applied time adjusting circuit 800 includes two delay circuits 81 and two exclusive-OR circuits 82 in sets. The two delay circuits 81 are connected to each other through an inverter 83, as shown in FIG. 2. Each of the delay circuits 81 receives a voltage-applied time signal and a modulation signal, and, in accordance with the voltage-applied time signal, delays the modulation signal. The exclusive-OR between the output signal of one of the delay circuits 81 and the modulation signal is obtained, and the obtained output signal is used to switch on the switch SW2. As a result, the following two pulses are generated: a first pulse that rises with the rise of the modulation signal, and falls as the rise of the delayed modulation signal; and a second pulse that rises with the fall of the modulation signal, and falls with the fall of the delayed modulation signal. Accordingly, a voltage is applied with the same pulse width as the delay time of the delay circuit 81, when the modulation signal rises and falls. Thus, a suitable voltage-applied time can be set. Likewise, the switch SW1 is controlled by the functions of the other one of the delay circuits 81 and the corresponding exclusive-OR circuit 82, so that an OFF bias voltage is provided. Thus, the switching on/off action of the laser diode LD is controlled (or speeded up). The structure and operation of the voltage-applied time adjusting circuit 800 will be described later in detail.

A current generating circuit 700 receives the differential voltage of each current output from the common-control-potential setting circuit 200 shown in FIG. 1, and outputs a current in accordance with the differential voltage. An operational amplifier 34 and a constant current source 32 receive a differential voltage that is formed with a reference common potential and a reference offset potential, and generates an offset current in accordance with the differential voltage. The offset current is applied to a load 24 via the switch SW16. The terminal potential of the capacitor C2 is determined by the offset current, and thus, the driving voltage to be applied to the laser diode LD from the capacitor C2 that functions as a voltage source can be adjusted. By adjusting the driving voltage, the driving pulse is overshot so that the laser can follow even a very small pulse width. In this manner, the highlight reproducibility can be increased. By setting the driving voltage at a slightly greater value, the outline of each image can be emphasized, for example. Through these setting operations suitable for each image, the image quality can also be adjusted. An operational amplifier 35 and a current source 31 receive a differential voltage that is formed by the reference common potential and the reference bias potential via a switch 750, and then generate a bias current in accordance with the differential voltage. The current source 31, which receives an OFF bias voltage that is set by a voltage source connected to the switch 750, generates a laser driving current in accordance with the OFF bias voltage.

In the above-described structure, the voltage-applied time adjusting circuit 800 serves to improve the response of each laser diode LD. In the following, the principles, the structure, and the operation of the voltage-applied time adjusting circuit 800 will be described in detail, with reference to the accompanying drawings.

Figure 4:
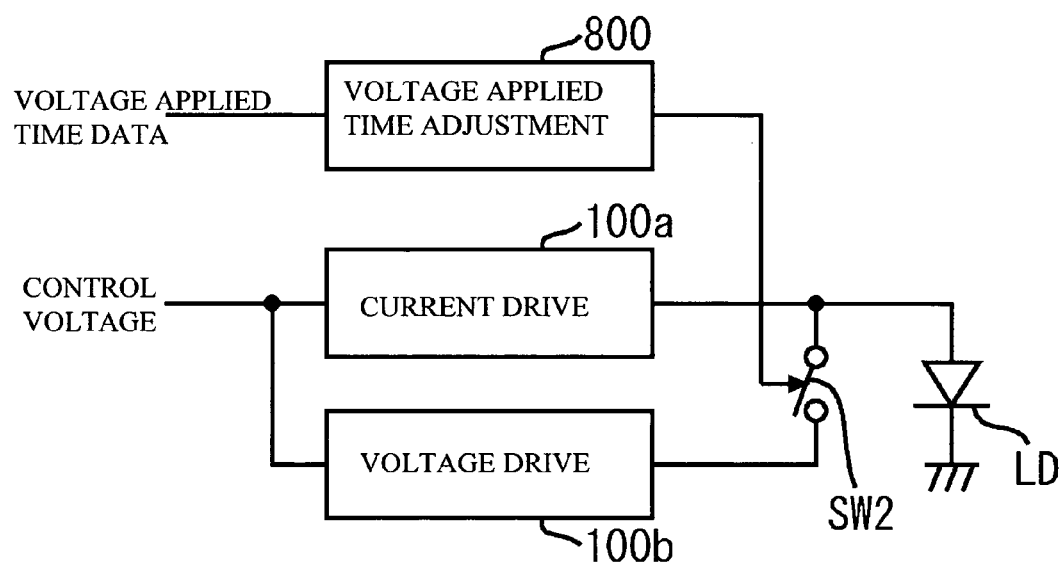
FIG. 4 illustrates the principles of a voltage-applied time adjusting circuit in accordance with the first embodiment of the present invention, and is a block diagram schematically illustrating the structure of the driver of FIG. 2.

FIG. 4 illustrates the principles of the voltage-applied time adjusting circuit 800. The driver unit 100 described earlier includes a current driving circuit 100a that is a current driver, and a voltage driving circuit 100b that is a voltage driver. The voltage driving circuit 100b is a laser diode driver for driving the laser diode LD by voltage, and functions as a compensator that drives the laser diode LD by voltage so as to compensate for at least one of the rising and falling responses of the laser diode driver 10. The current driving circuit 100a is a laser diode driver for driving the laser diode LD by current. Here, the voltage driving circuit 100b and the current driving circuit 100a may be regarded as one laser diode driver. In this structure, the voltage-applied time adjusting circuit 800 of this embodiment does not include a compensating circuit of a differential current circuit, or the like. Instead, the voltage-applied time adjusting circuit 800 performs on/off control on the switch SW2, so as to adjust the period of time during which the voltage driving circuit 100b performs voltage driving. In this manner, the voltage-applied time adjusting circuit 800 functions as a controller for performing on/off control on the switch SW2 in accordance with voltage-applied time data supplied from the outside. Thus, the voltage driving time of the laser diode LD is arbitrarily and suitably adjusted in programmable fashion.

Figure 5:
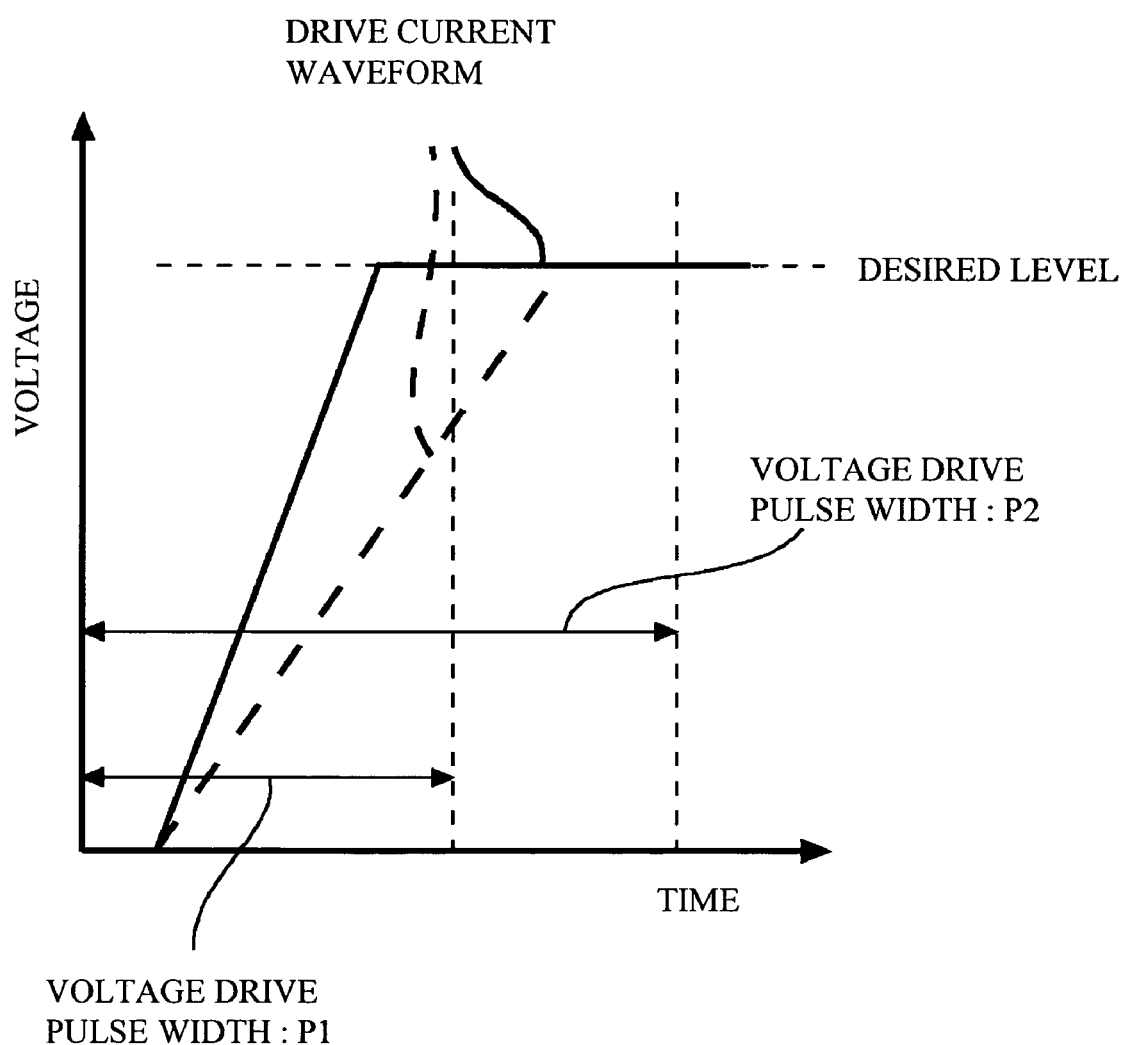
FIG. 5 is a graph showing the relationship between the voltage driving time and the driving current waveform at the time of driving a light-emitting device (laser diode) at a high speed.

FIG. 5 shows the relationship between the voltage driving time and the driving voltage waveform at the time of driving the laser diode LD at a high speed. Here, the laser diode is a surface-emitting laser. If the voltage driving pulse width is set at P1 in a case where the driving voltage waveform cannot sufficiently rise in a voltage driving operation due to the type of mounting of the driver unit 100 (the waveform being indicated by a broken line in FIG. 5), voltage application ends and current application starts before the voltage driving waveform sufficiently rises. In such a case, a good effect of voltage driving (i.e., speeding up the rise of a light quantity output) cannot be achieved. Therefore, the voltage driving pulse width can be changed from P1 to P2 in this embodiment. This can be done by the voltage-applied time adjusting circuit 800 adjusting the timing of switching on the switch SW2 (i.e., the timing of switching from P1 to P2) in accordance with the voltage-applied time data. In this manner, the voltage driving time can be adjusted in this embodiment, so that a desired laser beam quantity can be certainly obtained, regardless of the type of mounting of the driving circuit (the driver unit 100).

Further, the laser diode LD is voltage-driven with the voltage-applied time adjusting circuit 800 at the start of lighting up (referred to as the rise time) and at the start of lighting out (referred to as the fall time), and is current-driven at other times in this embodiment. Thus, the laser beam quantity can be prevented from varying with a variation in temperature.

Figure 6:
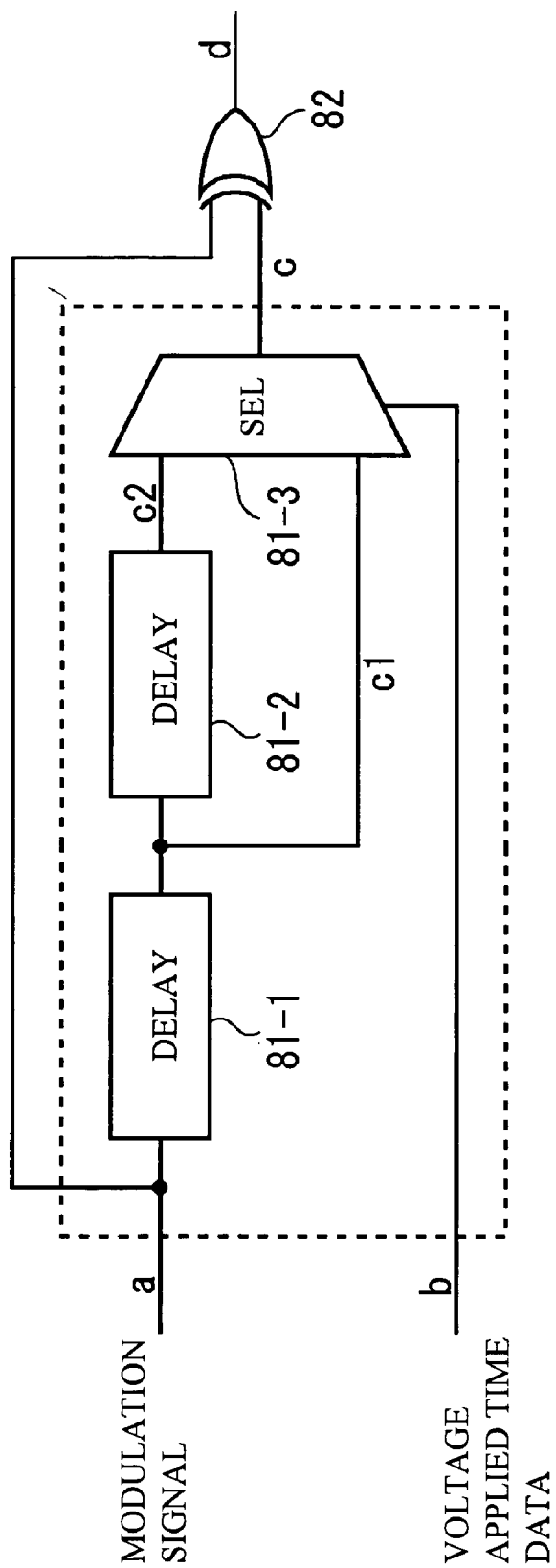
FIG. 6 illustrates an example circuit structure of the voltage-applied time adjusting circuit in accordance with the first embodiment of the present invention.

Referring now to FIG. 6, the circuit structure of the voltage-applied time adjusting circuit 800 of this embodiment will be described in detail. As already shown in FIG. 2, the voltage-applied time adjusting circuit 800 includes the delay circuits 81 and the exclusive-OR circuits 82.

A delay circuit 81 includes delay circuits 81-1 and 81-2, a selecting circuit 81-3 that selects one of the outputs of the delay circuits 81-1 and 81-2 in accordance with the voltage-applied time data, and a signal (a select signal) output from the selecting circuit 81-3, as shown in FIG. 6.

Figure 7:
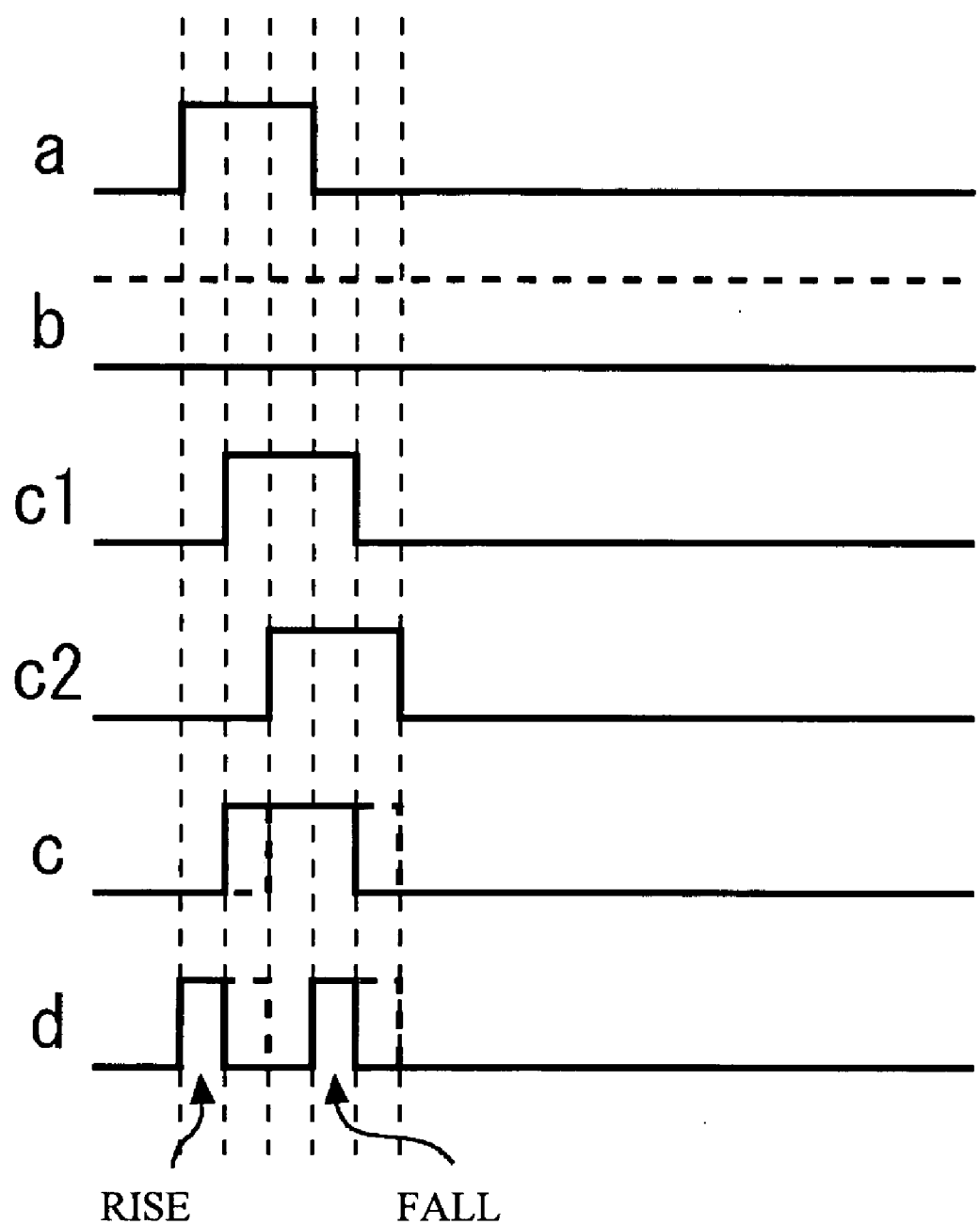
FIG. 7 is a timing chart showing the waveforms at the points a, b, c1, c2, c, and d shown in FIG. 6.

FIG. 7 is a timing chart that shows the waveforms at the points a, b, c1, c2, c, and d, which are shown in FIG. 6. The signal at these points will also be referred to as signals a, b, c1, c2, c, and d.

In FIG. 6, the signal a is a modulation signal as a current application pulse in accordance with image data. The signal a is delayed and converted into the signal c through the delay circuit 81-1, and is also delayed and converted into the signal C2 through the delay signals 81-1 and 81-2. The signals c1 and c2 are applied to the selecting circuit 81-3. In accordance with a signal b that is the voltage-applied time data (also referred to as a control signal), the selecting circuit 81-3 selectively outputs either the signal c1 or the signal c2. If the signal b is a low-level signal (indicated by a solid line in FIG. 7), the selecting circuit 81-3 outputs the signal c1 as the signal c. If the signal b is a high-level signal (indicated by a broken line in FIG. 7), the selecting circuit 81-3 outputs the signal c2 as the signal c. In FIG. 7, the signals in the case of the low-level signal b are indicated by solid lines, and the signals in the case of the high-level signal b are indicated by broken lines. The signal c is applied to the exclusive-OR circuit 82. The signal a (the modulation signal) is also inputted into the exclusive-OR circuit 82. As a result, the exclusive-OR circuit 82 outputs the signal d, which is the actual switching signal, as shown in FIG. 7.

With the above structure, the voltage driving circuit 100b shown in FIG. 4 can output a driving voltage that is adjusted in accordance with the voltage-applied time data at the time of rise or fall.

In this embodiment, the voltage-applied time adjusting circuit 800 is a circuit that switches on and off the switch SW2, using a delay circuit 81. However, the present invention is not limited to this structure, and any modification may be made to it as long as the voltage-applied time can be adjusted.

(Second Embodiment)

Figure 8:
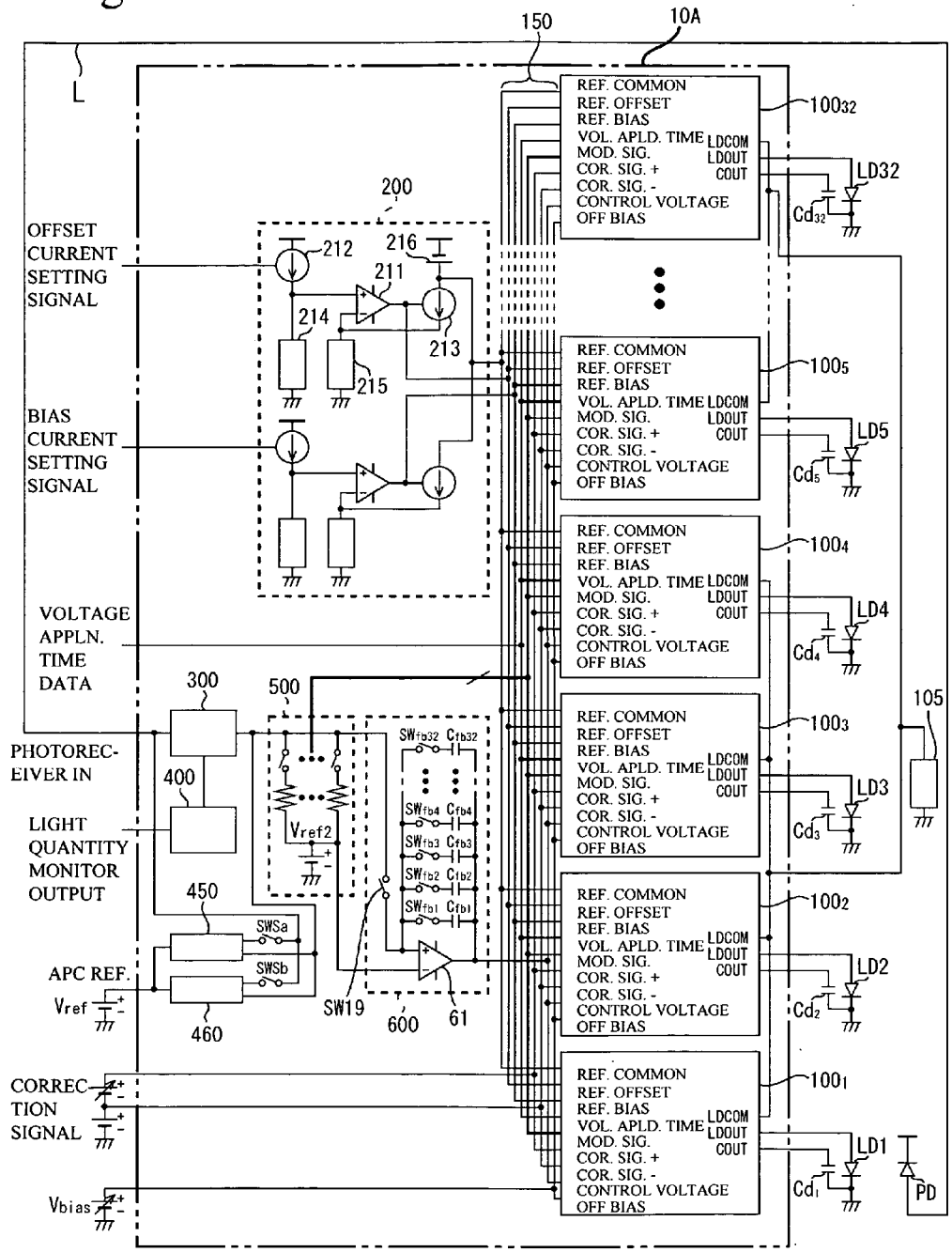
FIG. 8 is a circuit diagram illustrating the entire structure of a light-emitting device (laser diode) driver in accordance with a second embodiment of the present invention.

In the first embodiment, the data to be inputted from the outside so as to control the voltage-applied time adjusting circuit 800 (i.e., the voltage-applied time data) are set separately for each of the driver units $100_1$ through $100_{32}$ (in parallel operations through a bus). However, it is possible to set common data for all the driver units $100_1$ through $100_{32}$. More specifically, the voltage-applied time adjusting circuit 800 of each driver unit 100 can switch on and off each corresponding switch SW2 in accordance with the same voltage-applied time data. FIG. 8 illustrates a laser diode driver 10A having such a structure in accordance with this embodiment.

As shown in FIG. 8, in the laser diode driver 10A of this embodiment, the wire for inputting the voltage-applied time data into the voltage-applied time adjusting circuit 800 is a single-bit bus, instead of a multi-bit bus (a 32-bit bus in the first embodiment). The other aspects of this embodiment are the same as the first embodiment, and therefore, explanation of them is omitted herein.

In a case where the same voltage-applied time data are applied to all the driver units $100_1$ through $100_{32}$, as in this embodiment, it is necessary to adjust the voltage driving time to the value equivalent to or slightly smaller than the minimum pulse width required for the laser diode driver 10A.

The minimum pulse width is the pulse width of the driving current waveform provided by the laser diode driver 10A when the smallest pixel is drawn with a laser diode LD. For example, the minimum pulse width can be set as the period T2 during which the driving current converges, as shown in FIG. 9. However, it is possible to set the minimum pulse width as a period that is longer than the period T2 during which the driving current converges.

The lighting of each laser diode LD is switched on and off in accordance with the corresponding modulation signal. So as to adjust the voltage driving time properly for all the laser diodes LD, the adjustment range should be set within the minimum pulse width. Therefore, the voltage-applied time adjusting circuit 800 controls the switch SW2 so that the longest possible voltage driving time is secured within the minimum pulse width at the time of driving each laser diode LD by current.

In accordance with this embodiment described above, the circuit size (the chip size) can be reduced, and the mechanism for adjusting the voltage driving time can be simplified.

Furthermore, the minimum pulse width of the laser diode driver of the present invention can be adjusted, so that the laser diode driver can be employed in any type of image forming apparatus.

Although a few preferred embodiments of the present invention have been shown and described, it would be appreciated by those skilled in the art that changes may be made in these embodiments without departing from the principles and spirit of the invention, the scope of which is defined in the claims and their equivalents.

The entire disclosure of Japanese Patent Application No. 2003-206934 filed on Aug. 8, 2003 including specification, claims, drawings and abstract is incorporated herein by reference in its entirety.

What is claimed is:

1. A light-emitting device driver comprising:
   a driver unit that drives a light-emitting device;
   a compensator that compensates for at least one of a rising response and a falling response of the driver unit;
   a switching unit that switches on and off the compensator; and
   a control unit that performs on/off control on the switching unit.

2. The light-emitting device driver as claimed in claim 1, wherein:
   the driver unit is a current driver; and
   the compensator is a voltage driver.

3. The light-emitting device driver as claimed in claim 1, wherein the control unit controls the switching unit on the basis of data applied from an outside of the light-emitting device driver.

4. The light-emitting device driver as claimed in claim 1, wherein:
   the control unit comprises a plurality of units respectively associated with a plurality of light-emitting devices; and
   data applied from an outside of the light-emitting device driver are commonly applied to the plurality of units of the control unit.

5. The light-emitting device driver as claimed in claim 1, wherein the control unit controls the switching unit so as to provide a longest possible time for voltage driving within a minimum pulse width in current driving for the light-emitting device.

6. The light-emitting device driver as claimed in claim 1, wherein:
   the compensator and the driver unit drive the light-emitting device by controlling a voltage and/or current applied thereto in accordance with a modulation signal for modulating the light-emitting device; and
   the control unit includes delay circuits that produce delayed modulation signals from the modulation signal, and a selecting circuit that selectively outputs one of the delayed modulation signals in accordance with the data, the control unit controlling the switching unit in accordance with the amount of delay of said one of the delayed modulation signals.

7. A light-emitting device driver comprising:
   a current driver coupled to a laser diode;
   a switch;
   a voltage driver selectively coupled to the laser diode via the switch; and
   a controller that applies a control signal to the switch so that the switch can be kept ON during a period of time indicated by the control signal.

8. The light-emitting device driver as claimed in claim 7, wherein the control signal varies the time during which the switch is kept ON.

9. The light-emitting device driver as claimed in claim 7, wherein the controller applies the control signal to the switch when the laser diode at a start of lighting up and down the laser diode.

10. The light-emitting device driver as claimed in claim 7, wherein the current driver supplies a current based on a modulation signal to the laser diode.

11. The light-emitting device driver as claimed in claim 7, wherein:
   the current driver supplies a current based on a modulation signal to the laser diode; and
   the time indicated by the control signal is shorter than a minimum pulse width of the current based on the modulation signal.

12. The light-emitting device driver as claimed in claim 7, wherein the controller comprises:
   a delay circuit that delays a modulation signal used to drive the current driver and generates delayed signals; and
   a selector that selects one of the delayed signals in accordance with an external signal that indicates the time during which the laser diode is kept ON.

13. The light-emitting device driver as claimed in claim 7, the laser diode is a surface-emitting semiconductor laser diode.

14. The light-emitting device driver as claimed in claim 7, wherein the laser diode is one of laser diodes arranged in a matrix fashion.

15. A method of driving a laser diode comprising the steps of:
   supplying a current to the laser diode;
   applying a voltage across the laser diode during a period of time; and
   adjusting the period of time.

16. The method as claimed in claim 15, wherein the step of applying applies the voltage across the laser diode at a start of lighting up and down the laser diode.

17. An image forming apparatus comprising:
a light-emitting device; and
a light-emitting device driver,
the light-emitting device driver including:
a driver unit that drives the light-emitting device;
a compensator that compensates for at least one of a rising response and a falling response of the driver unit;
a switching unit that switches on and off the compensator; and
a control unit that performs on/off control on the switching unit.

18. An image forming apparatus comprising:
a laser diode; and
a driver,
the driver including:
a current driver coupled to the laser diode;
a switch;
a voltage driver selectively coupled to the laser diode via the switch; and
a controller that applies a control signal to the switch so that the switch can be kept ON during a period of time indicated by the control signal.

* * * * *